United States Patent

[11] 3,603,650

| [72] | Inventor | Robert L. Miller |
| | | 1320 K St., Anchorage, Alaska 99501 |
| [21] | Appl. No. | 800,093 |
| [22] | Filed | Feb. 18, 1969 |
| [45] | Patented | Sept. 7, 1971 |

[54] WHEEL LINERS FOR TRACK-TYPE VEHICLE
8 Claims, 22 Drawing Figs.

[52] U.S. Cl. .................................................. 305/25,
74/230.7, 305/28, 305/56
[51] Int. Cl. .................................................. B62d 55/14
[50] Field of Search ............................................. 305/56, 57,
24, 25, 27, 28; 74/230.7, 243

[56] References Cited
UNITED STATES PATENTS

| 1,317,650 | 9/1919 | Holt | 305/56 |
| 2,003,528 | 6/1935 | Best | 74/243 X |
| 2,374,644 | 5/1945 | Bombardier | 74/243 |
| 3,148,921 | 9/1964 | Batur | 305/57 X |
| 2,363,015 | 11/1944 | Norelius | 305/56 |
| 2,599,233 | 6/1952 | Christie | 305/11 |

FOREIGN PATENTS

| 720,092 | 4/1942 | Germany | 305/57 |

Primary Examiner—Richard J. Johnson
Attorney—Jesse David Wall

ABSTRACT: An abrasion preventing liner for the track engaging surface of the wheels and rollers of an endless track-type vehicle, such as used in earthmoving, is provided to extend the useful life of the endless track. The liners are made of a material which is softer than that of the track and wheels and is fitted into grooves on the wheels so as to minimize loss of dimensional stability.

PATENTED SEP 7 1971
3,603,650
SHEET 1 OF 3
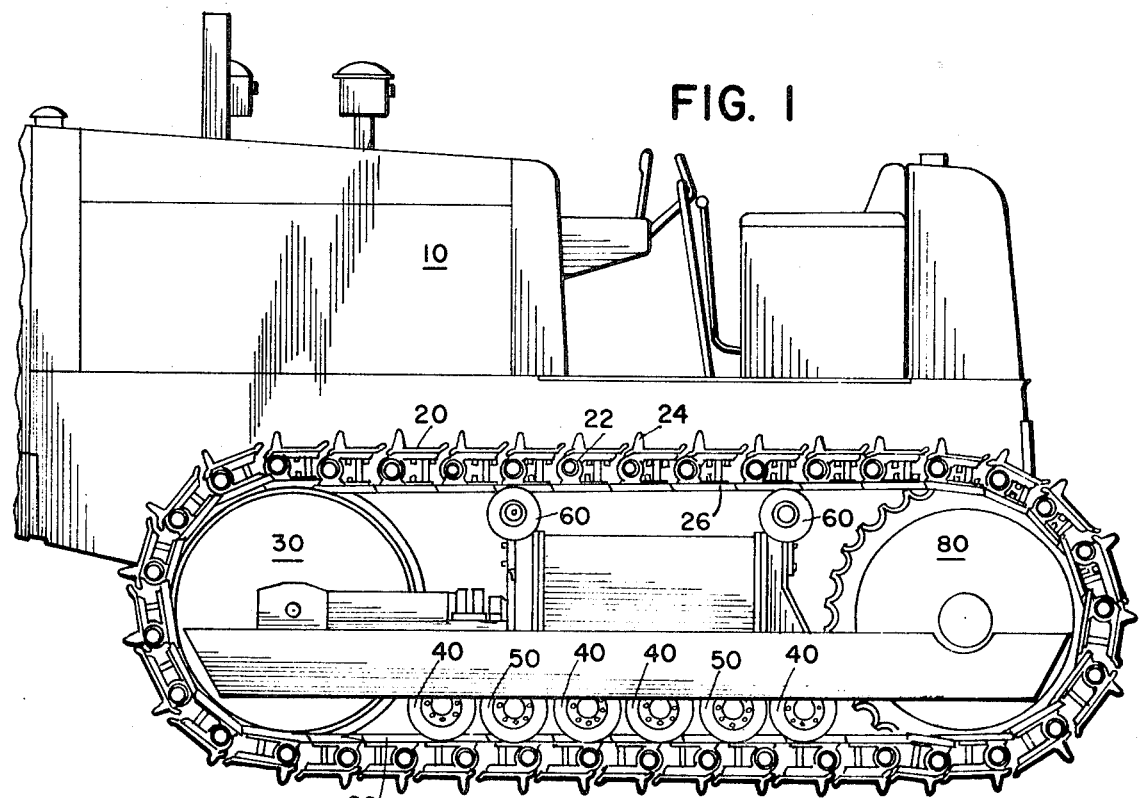
FIG. 1
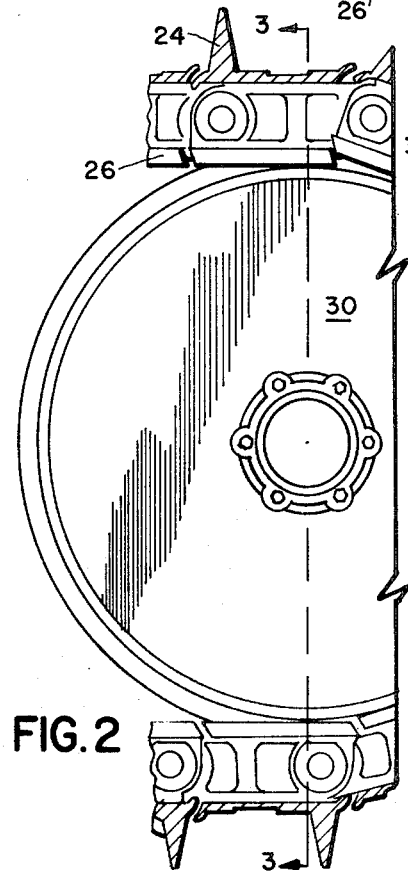
FIG. 2
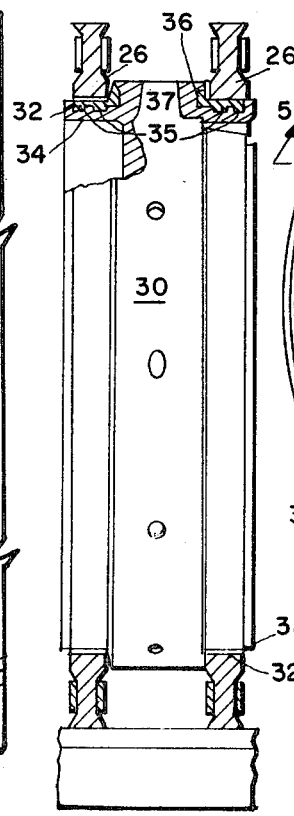
FIG. 3
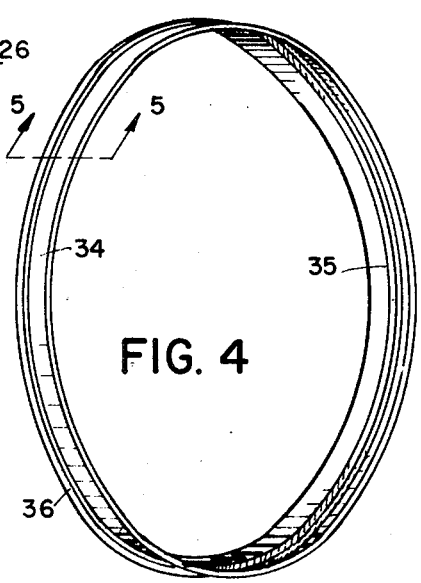
FIG. 4
FIG. 5
INVENTOR
ROBERT L. MILLER
Jesse David Wall
AGENT

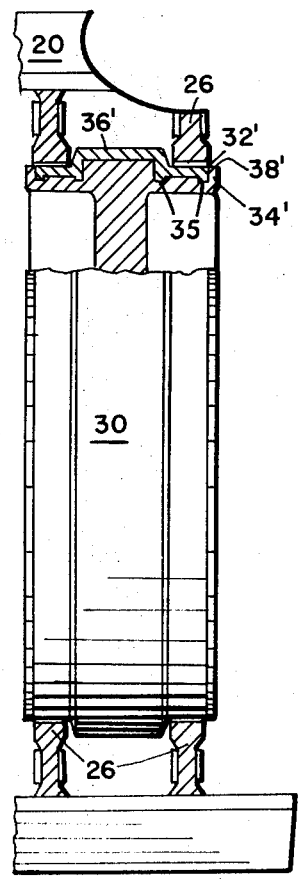
FIG. 7
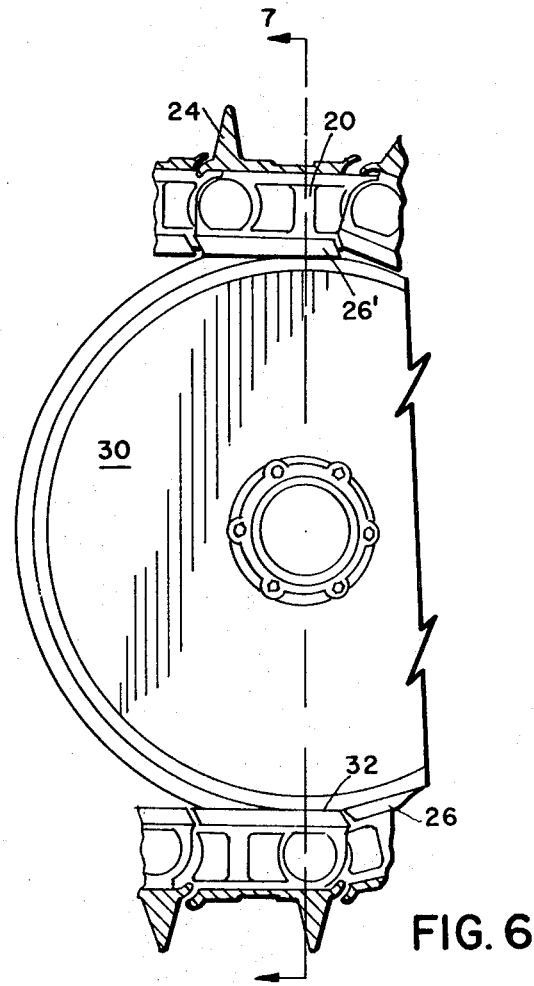
FIG. 6
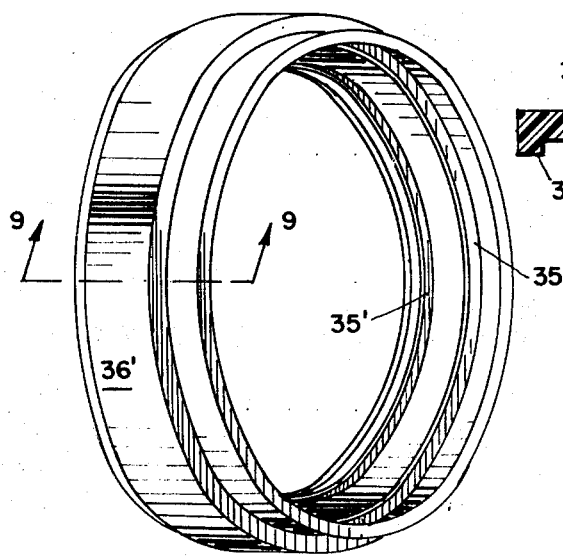
FIG. 9
FIG. 8
INVENTOR
ROBERT L. MILLER
BY *Jesse David Wall*
AGENT

PATENTED SEP 7 1971 3,603,650

INVENTOR
ROBERT L. MILLER

BY Jesse David Wall

AGENT

WHEEL LINERS FOR TRACK-TYPE VEHICLE

In track-type vehicles, such as are used in earthmoving, traction is provided by moving endless tracks which ride against wheels. With the present state of the art, the most successful tracks are formed of hinged steel sections. Each section is provided with one or more lugs on the outside traction surface and one or more, usually two, rails on the inner wheel-engaging surface. The most successful wheels to date have been made of solid steel and shaped to engage the track rails with directional stability.

Maintenance problems with the present track-laying vehicles have resulted from track malfunctions and wear on the track and wheels. One of the largest sources of track malfunctions is misalignment of the track due to high transverse service loads which are common in ordinary operation. This type of malfunction can lead to sudden failure due to track derailing. Misalignment can also lead to unusually high service loads on the hinge bearings between track sections. Another source of maintenance problems is the building up of dirt, mud, and other foreign matter on the load-bearing surfaces of the track rails and wheels.

In the past, maintenance has been minimized by the use of solidly built steel wheels of great dimensional stability. The track-engaging surface of these wheels has been shaped to give the track maximum directional stability and to provide a self-cleaning action to remove dirt and other foreign matter from the track rails and wheels. While this steel-on-steel engagement results in a considerable amount of wear on the track and wheel surfaces, this wear has been tolerated because the prior art alternatives lead to track failure and hinge wear which is nearly intolerable in comparison to the periodic maintenance which is necessary to repair the steel-on-steel surface wear.

Indeed, the periodic maintenance in which the above-mentioned parts are replaced or rebuilt has been found to be a major operating expense due to the rapid surface wear involved with the steel-on-steel method of locomotion. In particular, this wear has been found to be a limiting factor in the useful life of the track unit since the material and design of the lug and traction surface of the track sections has been improved along with that of the section hinges so that these components now outwear the wheel-engaging track rails.

I am aware of prior attempts to reduce track wear by using other than steel-to-steel contact between wheels and tracks. For example, other than steel wheels are shown by U.S. Pats. Nos. 1,336,122; 1,968,043; 3,013,843; 3,163,249; and 3,276,823. The shortcomings of these prior attempts lie in their failure to retain the advantages of steel-to-steel contact and the dimensionally stable steel wheels.

It is therefore an object of this invention to reduce track rail wear and wheel wear while minimizing the loss of the advantages of present wheel design.

It is also an object of this invention to decrease maintenance of track-laying vehicles without risking sudden failure due to track misalignment.

The present invention contemplates the provision of an abrasion-preventing liner for at least some of the load-bearing wheels in a track-laying vehicle. This liner should be made of a material which is softer than the steel used in the track rail so that wear of the latter is greatly reduced. The liner fits into a groove cut into the wheels where the wheels make contact with the track rails. Preferably, the groove is so shaped that the exposed portions of the inlaid liner is the same width as the track rail. In this way, the track rails are exposed only to the softer liner material under normal conditions. However, none of the directional stability of the wheel to track rail contact under high transverse load conditions is lost.

Further, it is preferable that the track rail and wheel be closely fitted near the edges of the groove so that foreign matter is cleaned from the track rails and the soft liner material is protected from excessive wear. Thus the hard steel wheel is used to protect the liner and the savings on track wear is not substituted for equally expensive maintenance of the wheel liners.

Further, it is preferable that the wheel and track are fit together so that directional stability is not lost should the liners wear out and expose the steel surfaces of the wheels. In this way, track-laying vehicles may be operated in remote regions or in other places where maintenance schedules must be spaced to accept the risk of greater wear on the vehicle without risking sudden failure. In this way, the advantage of improved track life is not traded for versatility of the vehicle.

These and other features and advantages of the present invention, to be limited only by the claims, will become apparent from the following description of the drawing, in which:

FIG. 1 is a view of a typical track-laying vehicle utilizing the improvements of this invention.

FIG. 2 and FIG. 3 are views of the idler wheel, FIG. 3 being a cross-sectional view taken on lines 3—3 of FIG. 2.

FIGS. 4 and 5 are views of the abrasion-absorbing liner to be used with the idler wheel of FIGS. 2 and 3, FIG. 4 being in perspective and FIG. 5 being a cross-sectional view taken on lines 5—5 of FIG. 4.

FIGS. 6 to 9 are views of a modified form of idler wheel and liner which can be used in place of that shown in FIGS. 2 to 5. FIG. 7 is taken on section lines 7—7 of FIG. 6 and FIG. 9 is taken on section lines 9—9 of FIG. 8.

Figure 10:
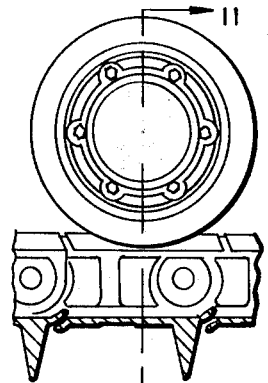
Figure 11:
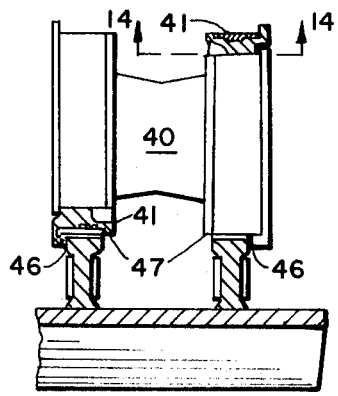
Figure 12:
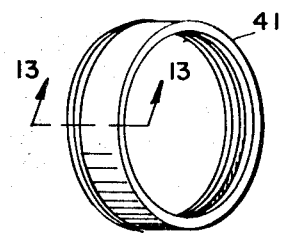
Figure 13:
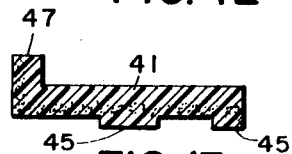
Figure 14:
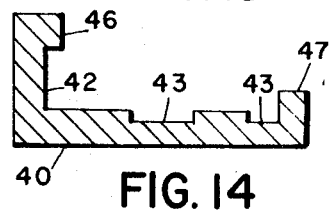
Figure 17:
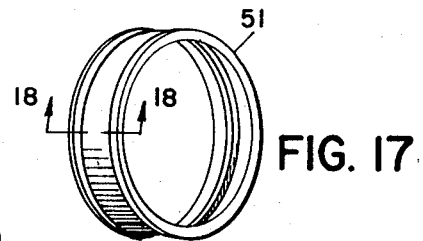

FIGS. 10 to 14 are views of the single flange truck wheels and liner which can be used in this invention. FIG. 11 is taken on lines 11—11 of FIG. 10. FIG. 13 is taken on lines 13—13 of FIG. 12. FIG. 14 is taken on lines 14—14 of FIG. 11.

Figure 15:
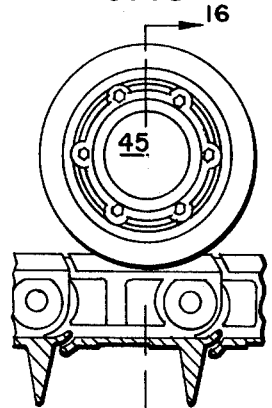
Figure 16:
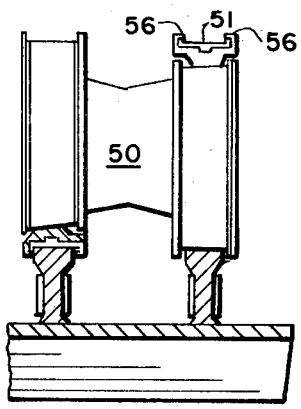
Figure 18:
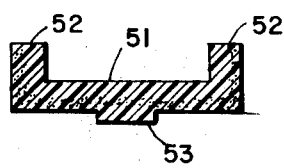
Figure 21:
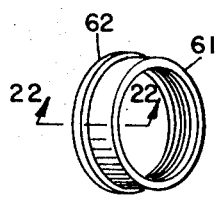

FIGS. 15 to 18 are views of the double-flange truck wheels and liner which can be used in this invention. FIG. 16 is a sectional view taken on lines 16—16 of FIG. 15 and FIG. 18 is a sectional view taken on lines 18—18 of FIG. 17.

Figure 19:
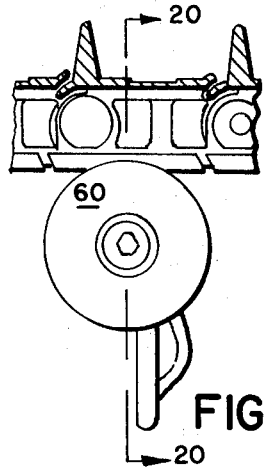
Figure 20:
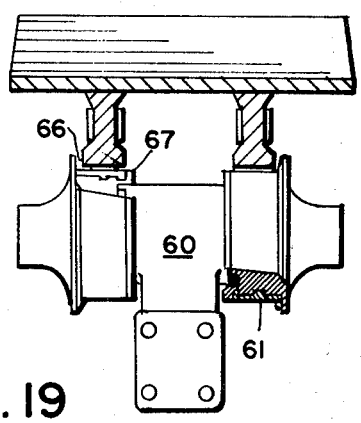
Figure 22:
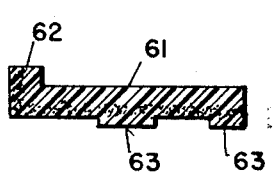

FIGS. 19 to 22 are views of the support wheels and liners which can be used in this invention. FIG. 20 is taken on the lines 20—20 of FIG. 19 and FIG. 22 is taken on the lines 22—22 of FIG. 21.

Referring now in particular to FIG. 1, a typical track-laying vehicle is shown generally at 10. The particular vehicle shown is of the type which is generally used in earthmoving. Track-laying vehicles in general attain traction by endless moving tracks 20 which are laid and driven by wheels which are attached to the vehicle 10. In the vehicle shown, the endless track 20 engages idler wheel 30, single-flange truck or lower track support wheels 40 and double-flange truck or lower track support wheels 50. Upper track support wheels 60 are used to minimize tensional stresses in the nonload bearing section of the track. The track is driven by sprocket wheel 80.

The track 20 is formed of sections hinged at 22. Each section is formed of one or more parts made of a strong hard durable material. Most tracks used today are made of steel sections. However, with advances in implementary arts, it may well happen that other materials and alloys may be found which are either cheaper or have better wear characteristics. Usually steel is used to make all of each section excepting for the bearings in the hinges 22. However, the parts of the track sections which are subjected to the greatest wear and stress are the cleats 24 on the outside surface of the track and the rail portions 26 on the inside wheel-engaging surfaces of the track sections. It has been found that a major source of maintenance cost is replacement and rebuilding of tracks due to wear to the track rails 26.

It is therefore desirable to reduce the wear on the track rails 26 so that they will last as long as the hinges 22 and cleats 24. This invention achieves the solution to this problem by providing at least some of the wheels with an inlaid liner on their track-engaging surfaces. This solution has been found to be particularly advantageous in the type of track-laying vehicle which has a plurality of truck wheels to support the vehicle. In this case, the maximum advantage has been found to be given by providing the idler wheels 30, the truck wheels 40 and 50, and the support wheels 60 with inlaid liners, but not the drive sprocket wheel 80.

Referring to FIGS. 2 to 5, the idler wheel 30 which is of very rigid and strong steel constructions is provided with a groove at the axially extending cylindrical surfaces 32 which contact and support the track rails 26. Inlaid into the groove in the surface 32 is an abrasion-absorbing liner 34 which is made of a material which is softer than that of the track rail 26 and that of the wheel 30.

This liner 34 may advantageously be made of a tough fibrous material such as that which is well known in the manufacture of brake linings and clutch facings. Such a liner can either be attached to the wheel by bonding a split ring of the liner material to the wheel or by fabricating the liner in place in one piece. If bonding is used, either mechanical or adhesive bonding such as is well known in the brake-lining and clutch-facing arts may be used. In the environment of this invention, bonding may have the unexpected advantage of being applicable even without disassembly of the equipment. Thus, if rivet bonding were used, replacement of a liner could be accomplished by fitting one end of a split ring liner into the wheel groove and moving the vehicle in stages while applying rivets. Also, adhesive bonding may be used with good advantage in some environments.

On the other hand, even greater savings of track rail wear at the expense of faster liner wear have been found to be gained by using a resilient material such as natural rubber for the liner. In addition to natural rubber, the following synthetic materials are suitable for liners: Butyl polymers, Choroprene polymers, Organic polysulphides, and Dimethyl butadiene polymers.

With particular reference to FIG. 3, the cross-sectional view of the wheel grooves shows recesses provided for projections 35 and 36 in the liner. These projections provide greater strength and dimensional stability to the liner while increasing the surface contact between the liner and wheel.

Projection 36 extends into the radially extending flange shown at reference numeral 37 in the wheel 30 of FIG. 3. The radially extending flange provides a track-aligning surface. The portion of the wheel surfaces 37 and 38 which are adjacent to the track-rail-engaging surfaces of the wheel are shown to be in close proximity to the track rails. Any foreign material such as mud and dirt which collect on the track rails will be cleaned by these adjacent steel surfaces 37 and 38 of the wheel. The adjacent steel surfaces are particularly useful to remove caked dirt from the edges and lateral surfaces of the wheels and track rails so that a dirt cake does not have a wraparound surface on which to cling. The grooves and liners are dimensioned so that the liners are inlaid into the surfaces of the wheels in that the top or exposed surface of the liner is flush with the surface of the wheel. This, together with the fact that the width of the exposed surface of the liner is the same as that of the track rail, protects the liner from excessive wear.

In the case where the liner is made of a resilient material, it may be desirable to provide the reinforcement in the form of cords 39. These cords may be made of natural fibers such as cotton or of synthetics such as rayon or nylon, and they may either be parallel or diagonally laid.

FIGS. 6 through 9 show a modified form of the idler wheel groove and liner. In this form, the liner is not inlaid in the wheel as it is in the embodiment of FIGS. 2 to 5. However, certain of the advantages of the inlaid configuration are retained while some structural advantages, particularly useful in liner replacement, are gained. The track-engaging surfaces 32' of wheel 30 are provided with grooves into which are fit abrasion-absorbing liner elements 34'. Here, as in the former embodiment, the grooves are provided with recesses into which are fit stabilizing projections 35'. Additionally, the liner elements 34' are interconnected by web portion 36'. Here, as in the former case, wheel surface 38' is provided to come into close proximity to the track rail to provide a cleaning action and to protect the liner from excessive wear and dimensional distortion. While the absence of steel wheel surface near the inside surfaces of the track rail loses some of the advantages of the former embodiment, these losses are compensated by the advantages gained by the interconnection provided by the web portion. Removal of the liners is facilitated by the interconnection when replacement is desired, while the interconnecting web 36' helps to hold the liners in position between replacements. Rivets may be applied to this web portion instead of the liner elements 34' if rivet bonding is utilized to fasten the liner to the wheel.

FIGS. 10 to 14 show the single flange truck wheels 40 and the wheel liners 41 applied thereto. FIG. 14 shows a view of the wheel groove which is provided with axial recess 42 in the radially extending track aligning surface 46, and radial recesses 43 in the axially extending track support surfaces 47. The wheel liner 41 is provided with lateral projection 44 and radial projections 45 to mate with the respective recesses. The steel portion of wheel surfaces 46 and 47 are provided to come into close proximity to the track rails so as to provide cleaning action and to protect the liners 41 from excessive wear and dimensional distortion.

FIGS. 15 to 18 show the double flange truck wheels 50 and wheel liners 51 applied thereto. The wheel liner 51 is provided with lateral projections 52 and radial projection 53 to engage mating recesses in the wheel grooves. The radially extending track-aligning surfaces 56 are provided to come into close proximity to the track rails so as to give a cleaning action and protect the liners 51 from excessive wear and dimensional distortion.

FIGS. 19 through 22 show the support wheels 60 and wheel liners 61. Wheel liners 61 are provided with lateral projections 62 and radial 63 to fit into complementary recesses in wheels 60. The wheel surfaces 66 and 67 near the grooves are shaped to come into close proximity to the track rails, primarily to give a good cleaning action.

In the case of the single and double flange truck wheels as in the case of the track support wheels, the liners are inlaid into the wheels in the sense that the surface of the liners is flush with the adjacent surfaces of the wheels, and the width of the exposed surfaces of the wheel liners is the same as the width of the track rails.

It will be noted that in all of the above cases, the shape of the wheels is the same with the liner applied as it would be without. Thus my improvement can be made on existing equipment without design changes. Either the wheels on existing equipment can be replaced with wheels having liners in accordance with my invention, or the existing wheels can be modified to accept liners by cutting grooves into their surfaces. Furthermore, the vehicle will continue to operate should the liners wear out; the absence of the liner only returning the vehicle to the condition in which it was found before my improvement.

Sprocket or drive wheel 80 may also be provided with liners if it has track-rail-engaging portions. Even for sprocket wheels which do not have track rail engaging portions, liners may be designed to fit into grooves cut into the sprocket portions. However, in some embodiments, such as the embodiment shown in FIG. 1, there may be advantages to leaving the sprocket wheel 80 without liners due to the extreme drive forces which are produced there.

From the above, it is clearly seen that the addition of a wheel liner to the wheels of a track-type vehicle, as defined and limited by the following claims, provides the unusual and unexpected result of reducing track wear while retaining to a maximum degree the advantages of the steel-on-steel method of locomotion which is common in such vehicles.

What I claim is:

1. In an endless track vehicle including a drive sprocket, front idler roller and upper and lower track support rollers;
  each of said rollers including at least one axially extending cylindrical portion providing a cylindrical track-supporting surface, and at least one radially extending flange providing a radially extending track-aligning surface,
  said cylindrical portion and said radially extending flange on at least some of said rollers each including annular groove means recessed into each respective surface, and annular abrasion-preventing liner means inlaid in said groove means with the outer surface of the liner means substantially flush with said radially extending aligning surface and said cylindrical supporting surface, and operative to prevent abrasion between the endless tracks and the rollers so that wear on the track and roller is reduced.

2. The improvements recited by claim 1 wherein:
the portions of the abrasion-absorbing liners exposed by said grooves have the same width as the track rails;
the wheels having surfaces adjacent to the track-engaging surfaces dimensioned to come into close proximity to the track rails and the wheels, so that the liners are protected from excessive wear.

3. The improvements of claim 1 wherein:
the liners are made of a tough fibrous material which is softer than the material of the track and that of the wheels.

4. The improvements of claim 1 wherein:
the liners are attached to the wheels by bonding the liner into the groove on the track-engaging surface of a wheel.

5. The improvements of claim 1 wherein:
the liners are made of a resilient material.

6. The improvements of claim 5 wherein:
the liner material is a member of the class consisting of natural rubber, Butyl polymers, Choroprene polymers, Organic polysulphides, and Dimethyl butadiene polymers.

7. The improvements of claim 5 wherein:
the resilient liner material is reinforced by cords.

8. The improvements of claim 5 wherein:
the liner means frictionally engages the surfaces of the wheel grooves and is easily replaced.